United States Patent [19]

Short, III et al.

[11] 4,441,350

[45] Apr. 10, 1984

[54] SCORED REVERSE BUCKLING RUPTURE DISK MANUFACTURING METHOD

[75] Inventors: Edward H. Short, III; Jerome D. Allen, both of Tulsa, Okla.; Loren E. Wood, deceased, Tulsa, Okla., by Anna L. Wood, executrix

[73] Assignee: BS&B Safety Systems, Inc., Tulsa, Okla.

[21] Appl. No.: 330,809

[22] Filed: Dec. 15, 1981
(Under 37 CFR 1.47)

[51] Int. Cl.³ .............................................. B21D 22/00
[52] U.S. Cl. .......................................... 72/55; 72/58; 72/60

[58] Field of Search ................... 72/54, 55, 56, 57, 58, 72/60, 61; 29/421 R, 157.1 R

[56] References Cited

U.S. PATENT DOCUMENTS 3,890,819  6/1975  DeLuca ................................. 72/57
3,921,556  11/1975  Wood et al. .................... 29/157.1 R Primary Examiner—Leon Gilden
Attorney, Agent, or Firm—C. Clark Dougherty, Jr.

[57] ABSTRACT

The present invention relates to improved methods and apparatus for manufacturing scored reverse buckling rupture disks. The scores on the disks radiate outwardly from central portions thereof toward the peripheries thereof and have known depths and depth variances.

8 Claims, 7 Drawing Figures

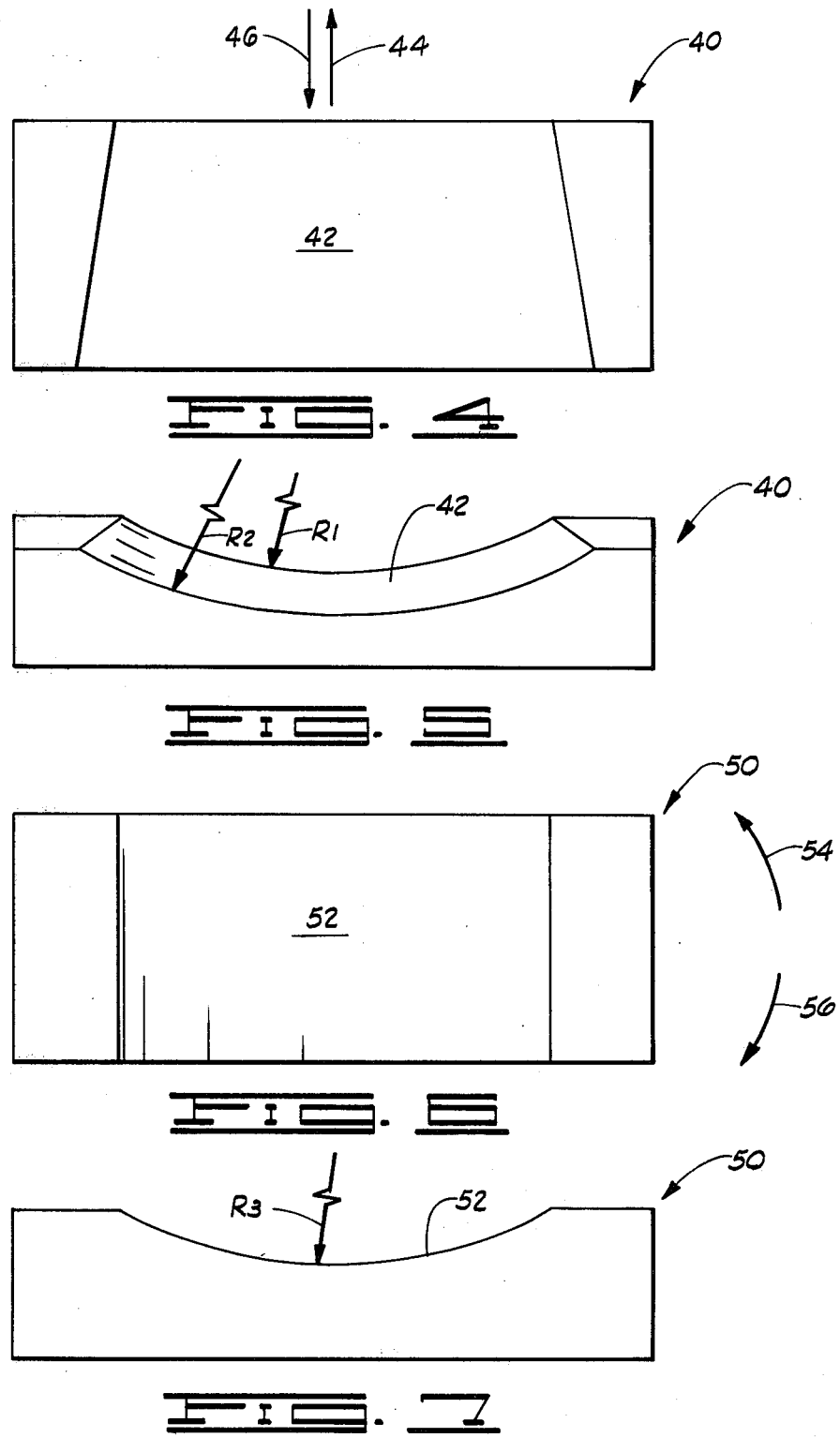

SCORED REVERSE BUCKLING RUPTURE DISK MANUFACTURING METHOD

BACKGROUND OF THE INVENTION

1. Field of the Invention

The present invention relates generally to improved methods and apparatus for manufacturing scored reverse buckling rupture disks, and more particularly, but not by way of limitation, to methods and apparatus for manufacturing scored reverse buckling rupture disks having concave-convex dome portions and scores radiating outwardly from central portions thereof.

2. Description of the Prior Art

Many safety pressure relief devices of the rupture disk type have been developed and used heretofore. Generally, such devices include a rupture disk supported between a pair of supporting members or flanges which are in turn connected to a relief connection in a vessel or system containing fluid pressure. When the pressure within the vessel or system exceeds the design rupture pressure of the disk, rupture occurs causing excess fluid pressure to be relieved from the vessel or system.

Rupture disks of the reverse buckling type, i.e., the fluid pressure is exerted on the convex side of the dome portion of the disk and upon failure the dome portion reverses and then ruptures, have also been developed and used successfully. Originally, such reverse buckling rupture disk assemblies included a reverse buckling rupture disk supported between inlet and outlet supporting members with a set of knife blades positioned adjacent the disk on the outlet side thereof so that when excessive fluid pressure was exerted on the convex side of the disk, the concave-convex portion reversed itself and impaled on the knife blades causing the concave-convex portion to open in a predetermined manner.

More recently, reverse buckling rupture disks have been developed which include scores or grooves on a surface of the concave-convex portion thereof creating lines of weakness therein so that upon reversal of the disk the concave-convex portion tears along the lines of weakness and opens without fragmentation. A method of manufacturing such disks is described and claimed in U.S. Pat. No. 3,921,556 issued Nov. 25, 1975 and assigned to the assignee of this present invention. While the method described in U.S. Pat. No. 3,921,556 has been used successfully for manufacturing scored reverse buckling rupture disks, because the depth variance of the scores formed in accordance with the method cannot be changed in the manufacturing process, a number of reforming and annealing steps are required to achieve the manufacture of scored reverse buckling rupture disks having desired operational characteristics. The term "depth variance" is used herein to mean the variation in depth of each of the scores formed on a disk from the central portion of the concave-convex dome portion of the disk towards the periphery thereof.

By the present invention, improved methods and apparatus for manufacturing scored reverse buckling rupture disks are provided which, because the depth variance of the scores can be adjusted during the manufacturing process, eliminates all or part of the reforming and annealing steps previously required. In addition, the scored reverse buckling rupture disks manufactured in accordance with the method of the present invention have improved operational characteristics.

SUMMARY OF THE INVENTION

By the present invention there is provided an improved method of manufacturing a group of scored reverse buckling rupture disks of desired reversal rupture pressure from sheet metal comprising the steps of dividing the sheet metal into a plurality of sections; forming a concave-convex dome in each of the sheet metal sections; and then forming identical scores of predetermined depth on a surface of each of the concave-convex dome portions of the sheet metal sections thereby creating identical lines of weakness therein, the scores radiating outwardly and having a predetermined depth variance from the central portions of the concave-convex dome portions of the sections towards the peripheries thereof. Apparatus for forming the scores of predetermined depth and predetermined depth variance is also provided.

It is, therefore, an object of the present invention to provide an improved method and apparatus for manufacturing a group of scored reverse buckling rupture disks whereby each of said disks has a known reversal rupture pressure.

A further object of the present invention is the provision of an improved method of manufacturing scored reverse buckling rupture disks whereby all or part of the reforming and annealing steps required in prior methods of manufacturing such disks are eliminated.

Yet a further object of the present invention is the provision of a method of manufacturing scored reverse buckling rupture disks whereby the disks produced reverse from the center of the concave-convex portions thereof and rupture in tension at a pressure no greater than 1.5 times the reversal rupture pressure of the disks.

Other and further objects, features and advantages of the invention will be apparent from the following description of the presently preferred embodiments, given for the purpose of disclosure and taken in conjunction with the accompanying drawings.

BRIEF DESCRIPTION OF THE DRAWINGS

FIG. 4 is an enlarged top view of one form of score anvil apparatus of the present invention.

FIG. 5 is a side view of the apparatus of FIG. 4.

FIG. 6 is a top view of an alternate form of score anvil apparatus of the present invention.

FIG. 7 is a side view of the apparatus of FIG. 6.

DESCRIPTION OF PREFERRED EMBODIMENTS

Figure 1:
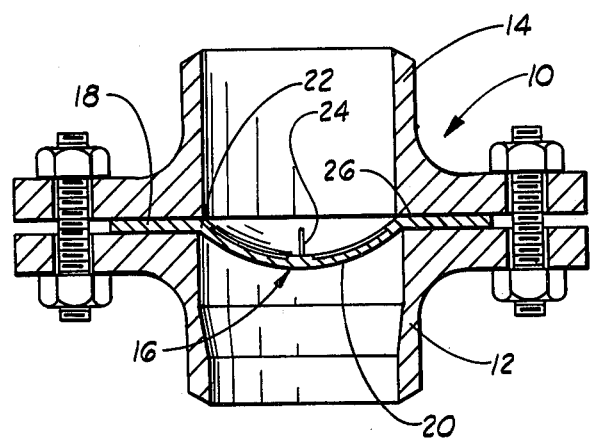
FIG. 1 is a side elevational view of a safety pressure relief device including a scored reverse buckling rupture disk taken in cross section.
Figure 2:
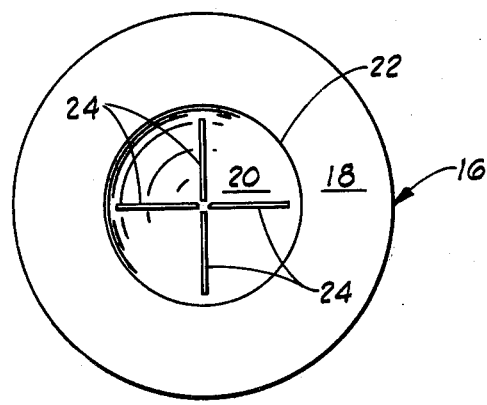
FIG. 2 is a top plan view of the scored reverse buckling rupture disk of FIG. 1.

Referring now to the drawings and particularly to FIGS. 1 and 2, a safety pressure relief device including a scored reverse buckling rupture disk is illustrated and generally designated by the numeral 10. The device 10 is basically comprised of inlet and outlet flange-type supporting members 12 and 14, respectively, with a scored reverse buckling rupture disk 16 clamped there-between. As will be understood by those skilled in the art, the supporting members 12 and 14 can take a variety of forms other than that shown in the drawings and described herein, e.g., the device 10 can include special cylindrical supporting members which are in turn clamped between conventional pipe or other flanges. In whatever form the supporting members 12 and 14 take, the inlet supporting member 12 is sealingly communicated with a vessel or system to be protected so that fluid pressure exerted within the vessel or system is communicated to the convex side of the rupture disk 16. The outlet supporting member 14 can be connected to a system for disposing of fluids released through the device 10 or can be left open to the atmosphere.

The scored reverse buckling rupture disk 16 includes a flat annular flange portion 18 connected to a concave-convex dome portion 20 by a transition connection 22. A plurality of grooves 24, referred to in the art as "scores" are disposed in the concave side of the concave-convex dome portion 20 creating lines of weakness therein. The scores 24 radiate outwardly from the central portion of the concave-convex dome portion 20 towards the periphery thereof. As is further well understood by those skilled in the art, the rupture disk 16 can take a variety of forms other than that illustrated in the drawings and described above. For example, the annular flat flange portion 18 can be omitted and the entire disk 16 can be formed of concave-convex dome shape. Further, the scores 24 can be disposed in the disk 16 on either the concave or the convex surface thereof and more or less than four scores can be utilized radiating outwardly from the central portion of the concave-convex dome portion towards the periphery thereof. A presently preferred embodiment of the scored reverse buckling rupture disks manufactured in accordance with the methods of the present invention include the annular flat flange portion 18 connected to the concave-convex dome portion 20 by the transition connection 22 with four scores 24 disposed in the concave surface of the concave-convex dome portion 20 radiating outwardly from the central portion thereof towards the periphery thereof so that the lines of weakness created by the scores 24 divide the concave-convex dome portion 20 into quadrants.

In operation of the safety pressure relief device 10, when the fluid pressure exerted on the convex side of the disk 16 exceeds the reversal rupture pressure of the disk, the concave-convex dome portion 20 reverses itself and tears along the lines of weakness created by the scores 24 so that the disk opens in a four-petal configuration.

Figure 3:
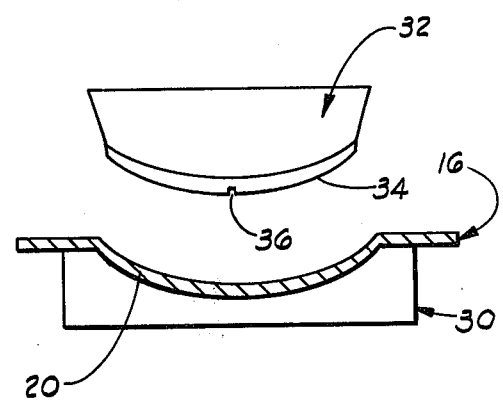
FIG. 3 is a side view, partially in section, illustrating the score blade and score anvil apparatus of the present invention utilized for forming scores in the concave-convex dome portion of a rupture disk.

Referring now specifically to FIG. 3, the methods of the present invention for manufacturing a group of scored reverse buckling rupture disks having a known reversal rupture pressure from sheet metal include the steps of dividing the sheet metal into a plurality of sections, forming a concave-convex dome in each of the sheet metal sections, and then forming identical scores of a predetermined depth in a surface of each of the concave-convex dome portions of the sheet metal sections thereby creating identical lines of weakness therein. In the score-forming step, the rupture disk 16 is placed on a score anvil 30, which will be described in greater detail hereinbelow, having a curved recess formed therein for receiving the convex side of the concave-convex dome portion of the disk. A score blade 32 having a curved leading edge 34 for forming one or more scores on the concave side of the concave-convex dome portion 20 of the disk 16 is provided and means (not shown) are attached to the score blade 32 and score anvil 30 for selectively bringing the curved leading edge 34 of the score blade 32 into forcible contact with the disk 16 and score anvil 30 whereby scores of a known depth are formed in the concave-convex dome portion 20 of the disk 16. As will be described further, the curved recess formed in the score anvil 30 is of a shape and configuration such that the depth variance of the scores formed in the dome portion 20 of the disk 16 from the central portion thereof to the periphery thereof can be increased or decreased as desired. In a preferred embodiment, the score blade 32 includes a curved leading edge 34 lying in a single plane and including a notch 36 at the center thereof so that when the score blade 32 is brought into forcible contact with the concave-convex dome portion of the rupture disk 16, two scores 34 are formed in the dome portion 20 extending in opposite directions from the central portion of the dome portion 20 towards the periphery thereof. After two oppositely extending scores 24 are formed in the dome portion 20, the disk 16 is rotated 90° and two additional scores 24 are formed therein to produce the score configuration illustrated in FIG. 2.

The depth of the scores 24 formed in the rupture disk 16 is controlled by controlling the force at which the score blade 32 contacts the disk 16 and the score anvil 30, and the scores 24 are formed in a manner such that each has a greater depth at the central portion of the concave-convex dome portion 20 of the disk 16 than at the peripheral portion thereof. Because of the depth variance of the scores 24, the scored reverse buckling rupture disks produced have less resistance to reversal at the central portions thereof than at the peripheries thereof and reverse from the center of the dome portion 20 outwardly which insures full opening of the disk 16 after reversal. By controlling the depth variance of the scores 24, i.e., the variation in depth of each score from the central portion of the dome 20 to the peripheral portion thereof, scored reverse buckling rupture disks can be produced without the annealing and reforming steps heretofore required or without a second annealing step. The scored rupture disks produced have constant reversal rupture pressures and have a ratio of tension rupture pressure to reversal rupture pressure equal to or less than 1.5.

The term "tension rupture pressure" is used herein to mean the fluid pressure exerted on the concave side of the concave-convex dome portion of a scored reverse buckling rupture disk required to cause the disk to rupture. The term "reversal rupture pressure" is used herein to mean the fluid pressure exerted on the convex side of the concave-convex dome portion of a scored reverse buckling rupture disk required to cause the concave-convex dome portion to reverse itself and tear along the lines of weakness created therein by the scores. The term "unscored tension rupture pressure" is used herein to mean the fluid pressure exerted on the concave side of the concave-convex dome portion of a disk prior to scoring the disk required to cause the concave-convex dome portion to rupture. The term "crown height" is used herein to mean the distance from the apex of the concave-convex dome portion of a rupture disk to the horizontal plane of the peripheral portions of the disk.

In a presently preferred method of manufacturing a group of scored reverse buckling rupture disks having a known reversal rupture pressure and a ratio of tension rupture pressure to reversal rupture pressure equal to or less than 1.5 from sheet metal, the sheet metal is first divided into a plurality of circular sections of disks of a diameter adapted to fit between the particular size of supporting members to be utilized with the rupture disks produced. The sections are then each clamped between a pair of conventional supporting members for forming concave-convex dome portions therein connected to a source of pressurized fluid, such as pressurized air. A concave-convex dome portion is formed in each of the sections by applying fluid pressure on one side thereof at a level exceeding the yield point of the metal from which the sections are formed. The initial forming step is controlled so that the concave-convex dome formed in each of the sheet metal sections has a crown height substantially equal to 13% of the diameter of the disk. This crown height is commonly known in the art as a 40% crown height meaning that the disk is bulged using a fluid pressure equal to 40% of the fluid pressure required to cause the disk to burst or rupture, i.e., 40% of the unscored tension rupture pressure. After each of the disks is initially formed in the manner described above, scores are formed in the concave-convex dome portions thereof having a known depth and having a known depth variance.

Referring specifically to FIGS. 4 and 5 one form of score anvil generally designated by the numeral 40 which can be utilized in accordance with the present invention is illustrated. The anvil 40 includes a curved recess 42 for receiving the convex side of the concave-convex dome portion of a rupture disk to be scored. As will be understood, the score blade (not shown) utilized with the anvil 40 includes a convex curved leading edge for forming one or more scores on the concave side of the concave-convex dome portion of the disk. The curved leading edge of the score blade has a radius of curvature substantially corresponding to the radius of curvature of the concave-convex dome portion of disks formed to a 40% crown height as described above. Further, as will be understood, rupture disks are manufactured in standard sizes and a score blade and score anvil are provided for each standard size.

The curved recess 42 of the anvil 40 is formed in a shape corresponding to a longitudinal segment of a right circular truncated cone. That is, the radius of curvature of the recess 42 at its narrow end, designated $R_1$ in FIG. 5, is equal to the radius of curvature of the leading edge of the score blade utilized with the anvil 40 and substantially corresponds to the radius of curvature of the concave-convex dome portion of a rupture disk formed to a 40% crown height. The radius of curvature of the recess 42 at the other end, designated $R_2$ on FIG. 5, is substantially larger than the radius of curvature $R_1$ so that between the ends of the recess 42 an infinite number of surfaces of various radii of curvature are provided. As stated above, conventional press means are provided attached to the anvil 40 and to the score blade used therewith whereby the score blade can be brought into forcible contact with the concave-convex dome portion of a rupture disk positioned on the anvil 40. The depth of scores formed in the dome portion of a rupture disk is controlled by controlling the force or load utilized in forming the scores. If it is desired that the scores formed be of uniform depth from the central portion of the dome portion towards the periphery of the dome portion, the anvil 40 is positioned relative to the score blade and the dome portion of the rupture disk to be scored whereby the narrow end of the recess 42 of the anvil 40 is positioned in alignment with the score blade. That is, the concave side of the concave-convex dome portion of a rupture disk to be scored is clamped or otherwise held in a position whereby when the score blade comes in contact with the concave side of the dome portion, scores are formed at the desired location thereon. The anvil 40 is moved beneath the concave-convex dome portion of the disk whereby a surface having the same radius of curvature as the score blade is positioned directly under the point of contact of the score blade with the rupture disk resulting in the formation of scores of equal depth from the central portion of the concave-convex dome portion of the disk to the periphery thereof. If it is desired to produce scores which are slightly deeper at the central portion of the concave-convex dome portion of the disk than at the periphery thereof, the anvil 40 is moved in a direction corresponding to the arrow 44 of FIG. 4 relative to the score blade and rupture disk whereby the curved surface beneath the concave-convex dome portion of the rupture disk is of slightly greater radius of curvature than the radius of curvature of the leading edge of the score blade. As will readily be apparent, the anvil 40 can be moved in the direction indicated by the arrow 44 to a position whereby the larger end of the recess 42 is beneath the rupture disk and score blade resulting in scores which have a considerable depth variance between the central portion of the dome portion of the rupture disk and the periphery thereof. Conventional mechanical means for moving the anvil 40 in directions indicated by the arrows 44 and 46 can be attached to the anvil 40 including a graduated indicator so that particular positions of the anvil 40 can be noted and recorded.

Referring now to FIGS. 6 and 7, an alternate form of anvil which can be utilized in accordance with the present invention is illustrated and generally designated by the numeral 50. The anvil 50 is similar to the anvil 40 described above except that the curved recess 52 formed therein has a shape corresponding to a longitudinal segment of a right cylinder. The radius of curvature of the recess 52, designated $R_3$ on FIG. 7, is equal to the radius of curvature of the score blade (not shown) utilized with the anvil 50. In operation, the anvil 50 is used in the same manner as the anvil 40 except that it is pivotable about a central vertical axis so that it can be moved relative to the score blade in directions indicated by the arrows 54 and 56 of FIG. 6. As will be understood, the recess 52 of the anvil 50 is positioned facing the convex curved leading edge of the score blade and when the long axis of the anvil 50 is parallel to the score blade, scores are formed in the concave-convex dome portion of a rupture disk positioned on the anvil 50 of equal depth from the central portion of the dome portion of the rupture disk towards the periphery thereof. When the anvil 50 is rotated in either direction indicated by the arrows 54 and 56, the radius of curvature of the surface of the recess 52 at the point of contact of the score blade is increased. Thus, by rotating the anvil 50, the scores formed on a rupture disk can be made deeper at the central portion of the dome portion of the rupture disk than at the peripheral portions thereof. Further, the variation in depth from the central portion to the periphery of the dome portion of the disk can be accurately controlled and reproduced. Like the anvil 42, the anvil 50 can have conventional mechanical means attached thereto including a graduated index whereby particular positions of the anvil 50 relative to the score blade used therewith can be noted and/or recorded.

After a group of metal disks has been scored, one or more of the disks are clamped into the dome-forming supporting members described above and increasing fluid pressure is applied on the concave side of the concave-convex dome portions thereof until the dome portions rupture thereby determining the tension rupture pressure of the disks. Once the tension rupture pressure of the disks is determined, one or more of the disks are clamped into the dome-forming supporting members and increasing fluid pressure is applied on the convex side of the concave-convex dome portions thereof until the dome portions reverse and rupture thereby determining the reversal rupture pressure of the disks.

In order to insure that the disks manufactured in accordance with the method of this invention have a tension rupture pressure such that if the disks reverse but do not open excessive pressure will not be required to rupture the disks in tension, the ratio of tension rupture pressure to reversal rupture pressure of the disks is controlled at a value of 1.5 or less. Since, under applicable pressure vessel piping codes the test pressure of pressure vessels and systems is set at 1.5 times the design pressure of such vessels and systems, it is desirable that scored reverse buckling rupture disks utilized with such vessels and systems have a reversal rupture pressure close to the design rupture pressure and a tension rupture pressure no higher than 1.5 times the reversal rupture pressure. This insures that if such disks reverse without rupturing due to the disks being damaged during installation or other reason, rupture will ultimately occur before the pressure level within the vessel or system exceeds the test pressure thereof.

In accordance with the method of the present invention, if the disks manufactured in the manner described above do not have the desired reversal rupture pressure, a second group of the disks can be scored using a different score depth and/or a different score depth variance. Generally, it is desirable that all of the scored reverse buckling rupture disks manufactured have a score depth at the central portion of the concave-convex dome portion at least slightly greater than the depth of the scores at the peripheral portion thereof so that the disks will have less resistance to reversal at the central portion than at the peripheral portion. When the reversal process of a reverse buckling scored rupture disk takes place at the center of the dome portion towards the periphery thereof, better operational results are achieved, i.e., the disks reliably tear along the lines of weakness created by the scores and open fully.

Once the particular depth and depth variance of scores which produce the desired reversal rupture pressure is determined by trial and error, if the ratio of tension rupture pressure to reversal rupture pressure is equal to or less than 1.5, then the additional disks are scored using such score depth and depth variance to thereby manufacture scored reverse buckling rupture disks having the desired reversal rupture pressure and tension rupture pressure to reversal rupture pressure ratio. It has been found that by varying the score depth and depth variance, scored reverse buckling rupture disks formed of certain materials such as aluminum can be manufactured without the necessity of reforming the disks and annealing the disks. However, in some instances, depending upon the particular metal utilized and the thickness of the disks to be manufactured, a desired reversal rupture pressure can be obtained, but the ratio of tension rupture pressure to reversal rupture pressure is above 1.5. In such instances, the ratio of tension rupture pressure to reversal rupture pressure can be lowered without appreciably affecting the reversal rupture pressure by reforming the concave-convex dome portions of the disks after scoring followed by annealing the disks. In the reforming step, the disks are each clamped into the dome-forming supporting members and fluid pressure applied on the concave sides thereof at a level below the tension rupture pressure so that the dome portions of the disks are reformed, i.e., the crown heights increased. Preferably, the fluid pressure applied in the reforming step is equal to from about 85% to about 95% of the tension rupture pressure of the disks. The reformed disks are next subjected to an annealing step to relieve stresses therein, and the combination of reforming and annealing the disks lowers the ratio of tension rupture pressure to reversal rupture pressure without materially changing the reversal rupture pressure obtained prior to the reforming and annealing steps. In carrying out the annealing step, the disks are preferably heated to a temperature in the range of from about 1500° F. to about 2000° F. for a period of time in the range of from about two minutes to about five minutes. At these temperatures and times, stresses set up in the disks are relieved, but the grain structure of the metal is not changed significantly.

The reforming and annealing steps are also carried out on disks which will be subjected to fluid pressures on both the convex and concave sides thereof. For example, scored reverse buckling ruptures disks are often utilized to isolate relief valves in accordance with the method described and claimed in U.S. Pat. No. 3,485,082 dated Dec. 23, 1969 owned by the assignee of this present invention. In accordance with such method, the relief valve can be tested by exerting fluid pressure between the concave side of the rupture disk and the relief valve without rupturing the disk in tension. However, when such pressure is exerted on the concave side of scored reverse buckling rupture disks which have not been reformed and annealed, the reversal rupture pressure can be changed due to the stresses set up in the concave-convex dome portions of the disks. Consequently, scored reverse buckling rupture disks to be used in this and other similar applications are reformed and annealed as a part of the manufacturing procedure to minimize changes in the reversal rupture pressure in operation of the disks.

As will be understood by those skilled in the art, the particular tension and reversal rupture pressure characteristics of scored reverse buckling rupture disks vary with a great number of variables, such as the size of the disks, the thickness of sheet metal employed, the particular metal from which the disks are formed, the crown height of the concave-convex dome portions, the depth and depth variance of the scores formed in the disks as well as the configuration of the scores. In carrying out the methods of the present invention for manufacturing scored reverse buckling rupture disks of desired reversal rupture pressure and having a ratio of tension rupture pressure to reversal rupture pressure equal to or less than 1.5, trial and error techniques are employed to determine the thickness of the sheet metal required, the depth and depth variance of the scores, etc. That is, sections of sheet metal formed of the particular metal required are cut into the required size and are placed into the dome-forming supporting members above. Increasing fluid pressure is applied thereto until rupture occurs so that the unscored tension rupture pressures for various thicknesses of sheet metal are determined. From this information a thickness of sheet metal is selected having an unscored tension rupture pressure approximately 2.25 to 5 times the desired reversal pressure of the scored reverse buckling rupture disks to be manufactured. As described above, concave-convex dome portions are formed in the disks to a 40% crown height. At this point, a group of the sections are scored in the manner described above to a known depth and a known depth variance such that the tension rupture pressure of the scored disks is in the range of from about 20% to about 45% of the unscored tension rupture pressure. The tension rupture pressure and reversal rupture pressure of the disks are next determined by applying increasing fluid pressure on the concave side of one or more disks until rupture occurs and on the convex side of one or more additional disks until reversal and rupture occurs, respectively. If the reversal rupture pressure obtained is too high or too low, and/or if the ratio of tension rupture pressure to reversal rupture pressure of the disks is too high, a second group of disks are scored to a different depth and/or different depth variance and the tension rupture pressure and reversal rupture pressure again determined. This trial and error technique is continued until the desired reversal rupture pressure is achieved and a ratio of tension rupture pressure to reversal rupture pressure equal to or less than 1.5 is obtained whereupon the remaining domed sections of sheet metal previously formed are scored to the depth and depth variance which resulted in the desired characteristics.

As mentioned above, in some instances depending upon the particular metal used, the thickness of the disks, etc., the desired reversal rupture pressure is achieved by varying the depth and depth variance of the scores, but a ratio of tension rupture pressure to reversal rupture pressure of 1.5 or less cannot be obtained. In these instances, the additional steps of reforming the scored disks and annealing the disks can be utilized to lower the ratio. The ability to accurately control the depth variance of the scores results in scored reverse buckling rupture disks having improved operational characteristics as well as a manufacturing method which is more economical to carry out than prior methods. The scored reverse buckling rupture disks manufactured in accordance with the methods of this invention can achieve full opening in lower pressure applications more dependably than disks manufactured in accordance with prior methods. The method of this invention eliminates at least one annealing step utilized heretofore and as mentioned above, in some cases eliminates the necessity of reforming and/or annealing the disks entirely. The apparatus of the present invention for forming the scores on scored reverse buckling rupture disks provide means for accurately controlling the depth variance of the scores during the manufacturing process and is more economical to manufacture as compared to scoring apparatus utilized heretofore.

Thus, the present invention is well adapted to carry out the objects and attain the ends and advantages mentioned above as well as those inherent therein. While presently preferred embodiments of this invention have been described for purposes of this disclosure, numerous changes in the order of steps, arrangement of parts and configuration of rupture disks produced will suggest themselves to those skilled in the art, which changes are encompassed within the spirit of this invention and scope of the appended claims.

What is claimed is:

1. An improved method of manufacturing a group of scored reverse buckling rupture disks of desired reversal rupture pressure from sheet metal comprising the steps of:
   (a) dividing said sheet metal into a plurality of sections;
   (b) forming a concave-convex dome in each of said sheet metal sections; and
   (c) forming identical scores of predetermined depth on a surface of each of said concave-convex dome portions of said sheet metal sections thereby creating identical lines of weakness therein, said scores radiating outwardly and having a greater depth, at the central portions of the radii of said concave-convex dome.

2. The method of claim 1 wherein said scores are deeper at the central portions of said concave-convex dome portions of said sections than at the peripheries thereof whereby said concave-convex dome portions have less ability to resist reversal at the central portions thereof than at the peripheries thereof.

3. The method of claim 2 which is further characterized to include the steps of:
   (d) reforming said scored concave-convex dome portions of said sections to increase the crown heights thereof; and
   (e) annealing said sections to relieve stresses therein.

4. An improved method of manufacturing a group of scored reverse buckling rupture disks of desired reversal rupture pressure from sheet metal comprising the steps of:
   (a) dividing said sheet metal into a plurality of sections;
   (b) forming a concave-convex dome in each of said sheet metal sections by applying fluid pressure on a circular area of one surface thereof;
   (c) forming identical scores of known depth on a surface of each of said concave-convex dome portions of a group of said sheet metal sections, said scores radiating outwardly and having a greater depth at the central portions of said concave-convex dome portions of said sections;
   (d) applying increasing fluid pressure on the concave side of said concave-convex dome portion of one or more of said group of scored sections until said dome portion ruptures thereby determining the tension rupture pressure of said scored sections;
   (e) applying increasing fluid pressure on the convex side of the concave-convex dome portion of one or more of said scored sections until said dome portion reverses itself and ruptures thereby determining the reversal rupture pressure of said sections;
   (f) repeating steps (c) through (e) on additional groups of said sheet metal sections while varying the depth and depth variance of said scores formed in accordance with step (c) until a desired reversal rupture pressure is obtained in step (e) and the ratio of tension rupture pressure to said reversal rupture pressure is equal to or less than 1.5; and
   (g) carrying out step (c) on each of the remaining sheet metal sections using the depth and depth variance of scores which resulted in said desired reversal rupture pressure and a ratio of tension rupture pressure to reversal rupture pressure equal to or less than 1.5.

5. The method of claim 4 wherein said scores are deeper at the central portions of said concave-convex dome portions of said sections than at the peripheries thereof whereby said concave-convex dome portions have less ability to resist reversal at the central portions thereof than at the peripheries thereof.

6. An improved method of manufacturing a group of scored reverse buckling rupture disks of desired reversal rupture pressure from sheet metal comprising the steps of:

(a) dividing said sheet metal into a plurality of sections;

(b) forming a concave-convex dome in each of said sheet metal sections by applying fluid pressure on a circular area of one surface thereof;

(c) forming identical scores of known depth on a surface of each of said concave-convex dome portions of a group of said sheet metal sections, said scores radiating outwardly and having a greater depth at the central portions of said concave-convex dome portions of said sections (d) applying increasing fluid pressure on the concave side of said concave-convex dome portion of one or more of said group of scored sections until said dome portion ruptures thereby determining the tension rupture pressure of said scored sections;

(e) applying fluid pressure on the concave side of said concave-convex dome portions of the remaining of said group of scored sheet metal sections at a level in the range of from about 85% to about 95% of said tension rupture pressure;

(f) annealing said scored sheet metal sections to relieve stresses therein;

(g) applying increasing fluid pressure on the convex side of the concave-convex dome portion of one or more of said scored sheet metal sections until said dome portion reverses itself and ruptures thereby determining the reversal rupture pressure of said sections;

(h) repeating steps (c) through (g) on additional groups of said sheet metal sections while varying the depth and depth variance of said scores formed in accordance with step (c) until a desired reversal rupture pressure is obtained in step (g) and the ratio of tension rupture pressure to said reversal rupture pressure is equal to or less than 1.5; and (i) carrying out steps (c), (e) and (h) on each of the remaining sheet metal sections using the depth and depth variance of scores in step (c) which resulted in said desired reversal rupture pressure and a ratio of tension rupture pressure to reversal rupture pressure equal to or less than 1.5.

7. The method of claim 6 wherein said scores formed in said rupture disks in accordance with step (c) are formed in a manner such that said scores are deeper at the center of the dome portion than at the periphery thereof.

8. The method of claim 7 wherein the annealing of said sheet metal sections in accordance with step (f) comprises heating said sheet metal sections to a temperature in the range of from about 1500° F. to about 2000° F. for a period of time in the range of from about 2 minutes to about 5 minutes.

* * * * *